United States Patent
Rau et al.

(10) Patent No.: US 10,838,801 B2
(45) Date of Patent: Nov. 17, 2020

(54) AUTOMATICALLY SOLVING COMPUTER SYSTEM ERROR STATES VIA A COMPARATIVE HISTORICAL ANALYSIS OF ERROR STATES, LOGS, PROFILE CONFIGURATIONS, AND OPERATOR RESPONSES

(71) Applicant: International Business Machines Corporation, Armonk, NY (US)

(72) Inventors: Benjamin T. Rau, Raleigh, NC (US); Dwight E. Allen, Jr., Raleigh, NC (US); Scott D. Malzahn, Durham, NC (US); Grant S. Mericle, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 15/997,054

(22) Filed: Jun. 4, 2018

(65) Prior Publication Data
US 2019/0370105 A1    Dec. 5, 2019

(51) Int. Cl.
*G06F 11/00* (2006.01)
*G06F 11/07* (2006.01)
*G06F 16/248* (2019.01)
*G06F 16/2457* (2019.01)

(52) U.S. Cl.
CPC ........ *G06F 11/0793* (2013.01); *G06F 11/079* (2013.01); *G06F 11/0751* (2013.01); *G06F 11/0787* (2013.01); *G06F 16/248* (2019.01); *G06F 16/24578* (2019.01)

(58) Field of Classification Search
CPC ............ G06F 11/0751; G06F 11/0787; G06F 11/079; G06F 11/0793
See application file for complete search history.

(56) References Cited

U.S. PATENT DOCUMENTS

| | | | |
|---|---|---|---|
| 5,463,768 A | 10/1995 | Cuddihy et al. | |
| 7,904,756 B2 | 3/2011 | Dilman et al. | |
| 9,336,259 B1 | 5/2016 | Kane | |
| 9,542,255 B2 | 1/2017 | James et al. | |
| 9,552,249 B1 | 1/2017 | James et al. | |
| 2005/0015678 A1* | 1/2005 | Miller | G06F 11/0748 714/38.14 |
| 2008/0162688 A1* | 7/2008 | Reumann | G06F 11/0748 709/224 |

(Continued)

OTHER PUBLICATIONS

Bruns, et al. "Providing Help for Novices Using Expert Knowledge", RWTH Aachen University, 2011, 11 pages.

(Continued)

*Primary Examiner* — Michael Maskulinski
(74) *Attorney, Agent, or Firm* — Cantor Colburn LLP; Teddi Maranzano

(57) ABSTRACT

A computer-implemented method for ranking and presenting actions executed by prior users when an error scenario occurs in a computer system is provided. The computer-implemented method includes identifying an error with the computer system and entering an error state with respect to the error. The computer-implemented method includes recording operations within the computer system during the error state and exiting the error state based on an exit condition.

17 Claims, 3 Drawing Sheets

Process Flow 300

(56) References Cited

U.S. PATENT DOCUMENTS

| | | | |
|---|---|---|---|
| 2010/0199132 A1* | 8/2010 | Compton | G06F 11/0709 |
| | | | 714/57 |
| 2013/0007527 A1* | 1/2013 | Petukhov | G06F 11/0793 |
| | | | 714/37 |
| 2015/0052122 A1* | 2/2015 | Landry | G06F 11/0706 |
| | | | 707/723 |
| 2016/0132372 A1* | 5/2016 | Anderson | G06F 11/079 |
| | | | 714/15 |
| 2018/0095847 A1* | 4/2018 | Patil | G06Q 50/01 |
| 2019/0121717 A1* | 4/2019 | Francis | G06F 11/0793 |
| 2019/0188067 A1* | 6/2019 | Chen | G06F 11/0775 |
| 2019/0266070 A1* | 8/2019 | Bhandarkar | G06F 11/0751 |
| 2019/0347148 A1* | 11/2019 | Gomes Pereira | G06K 9/6267 |
| 2019/0347149 A1* | 11/2019 | Panigrahi | G06F 11/0793 |
| 2020/0053532 A1* | 2/2020 | Hurst | H04W 4/60 |

OTHER PUBLICATIONS

Hartmann, et al. "What would other programmers do: suggesting solutions to error messages", 2010, Proceedings of the SIGCHI Conference on Human Factors in Computing Systems, pp. 1019-1028.

* cited by examiner

AUTOMATICALLY SOLVING COMPUTER SYSTEM ERROR STATES VIA A COMPARATIVE HISTORICAL ANALYSIS OF ERROR STATES, LOGS, PROFILE CONFIGURATIONS, AND OPERATOR RESPONSES

BACKGROUND

The disclosure relates generally to automatically solving computer system error states via a comparative historical analysis of error states, logs, profile configurations, and operator responses.

In general, conventional computer systems have an inherent difficulty with respect to a novice user being unable to correct error scenarios with the conventional computer systems. In most cases, when abilities of the novice user are limited, a need for expertise grows exponentially as time progresses during the error scenarios for conventional computer systems. Thus, the conventional computer systems have a need for automatically solving error scenarios efficiently and promptly and/or providing automatic assistance to novice users in solving error scenarios

SUMMARY

According to one or more embodiments, a computer-implemented method for ranking and presenting actions executed by prior users when an error scenario occurs in a computer system is provided. The computer-implemented method includes identifying an error with the computer system and entering an error state with respect to the error. The computer-implemented method includes recording operations within the computer system during the error state and exiting the error state based on an exit condition.

According to one or more embodiments, the above computer-implemented method can be implemented as a computer program product and/or a computer system.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

In view of the above, embodiments disclosed herein may include system, method, and/or computer program product (herein a computer system) that ranks and presents relevant actions executed by prior users when an error scenario occurs in a computer system (and actions executed by prior users while the computer system is in previous error states) as possible solutions the next time the error scenario occurs to a novice user. The ranking and presenting of the possible solutions is useful because the novice user may not know certain commands and/or actions exist and because the novice user may also not know where a profile configuration is located. Note that relevant publications can also be ranked and presented to the novice user.

Technical effects and benefits include providing direct solutions in the face of error scenarios that improve operations of the computer system, reducing downtime for the computer system, and solving when the novice user confronts a problem and does not know where to begin. Thus, embodiments described herein are necessarily rooted in the computer system and/or the processor of the computer system to perform proactive operations to overcome problems specifically arising in the realm of (e.g., these problems include the error scenarios for conventional computer systems persisting as time progresses while a need for expertise grows exponentially, resulting in unnecessary downtown and unwanted costs and expenses).

Figure 1:
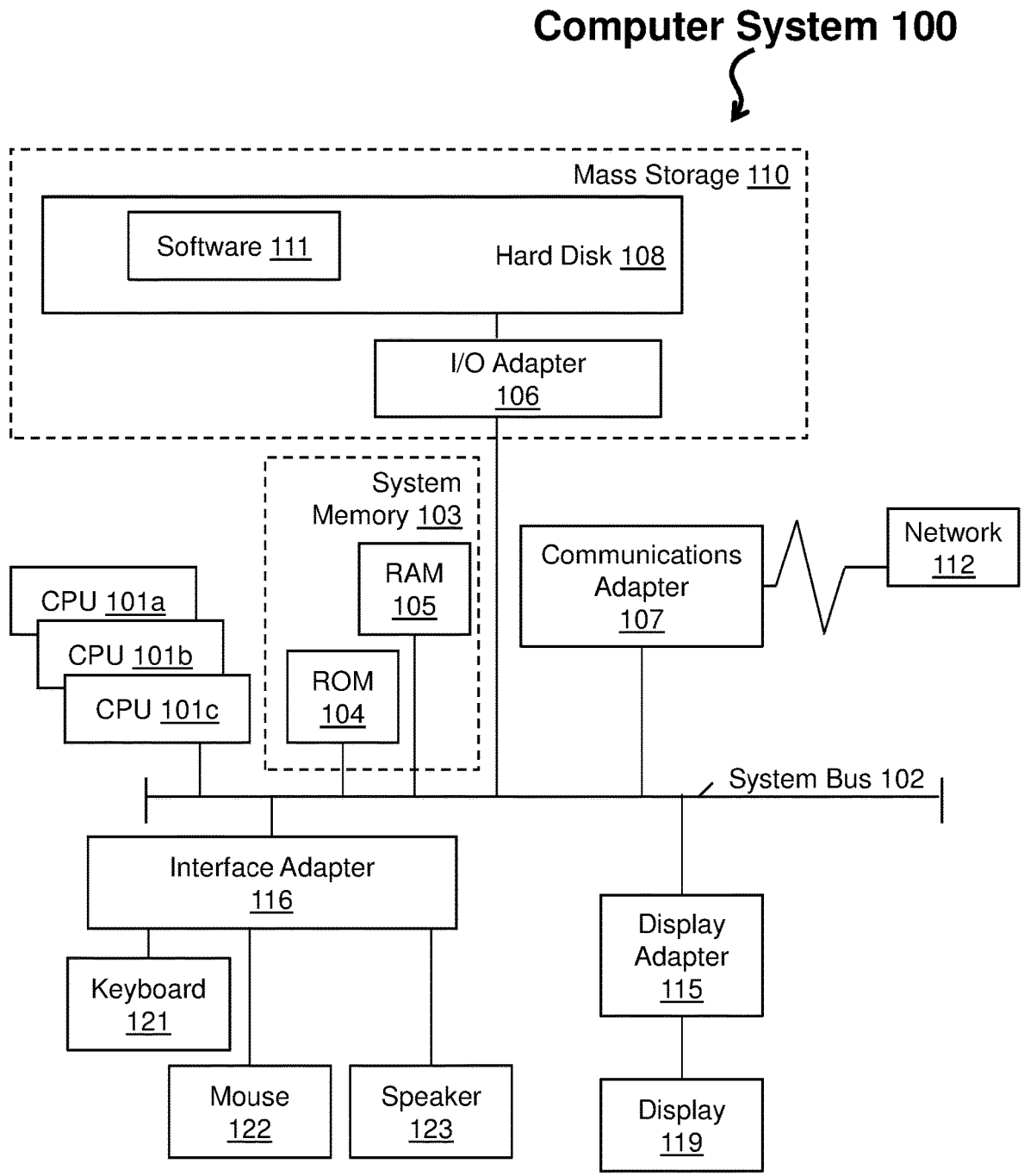
FIG. 1 depicts a system in accordance with one or more embodiments.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others.

As shown in FIG. 1, the computer system 100 has one or more central processing units (CPU(s)) 101*a*, 101*b*, 101*c*, etc. (collectively or generically referred to as processor(s) 101). The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110. A software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein with reference to FIGS. 2-3. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

Figure 2:
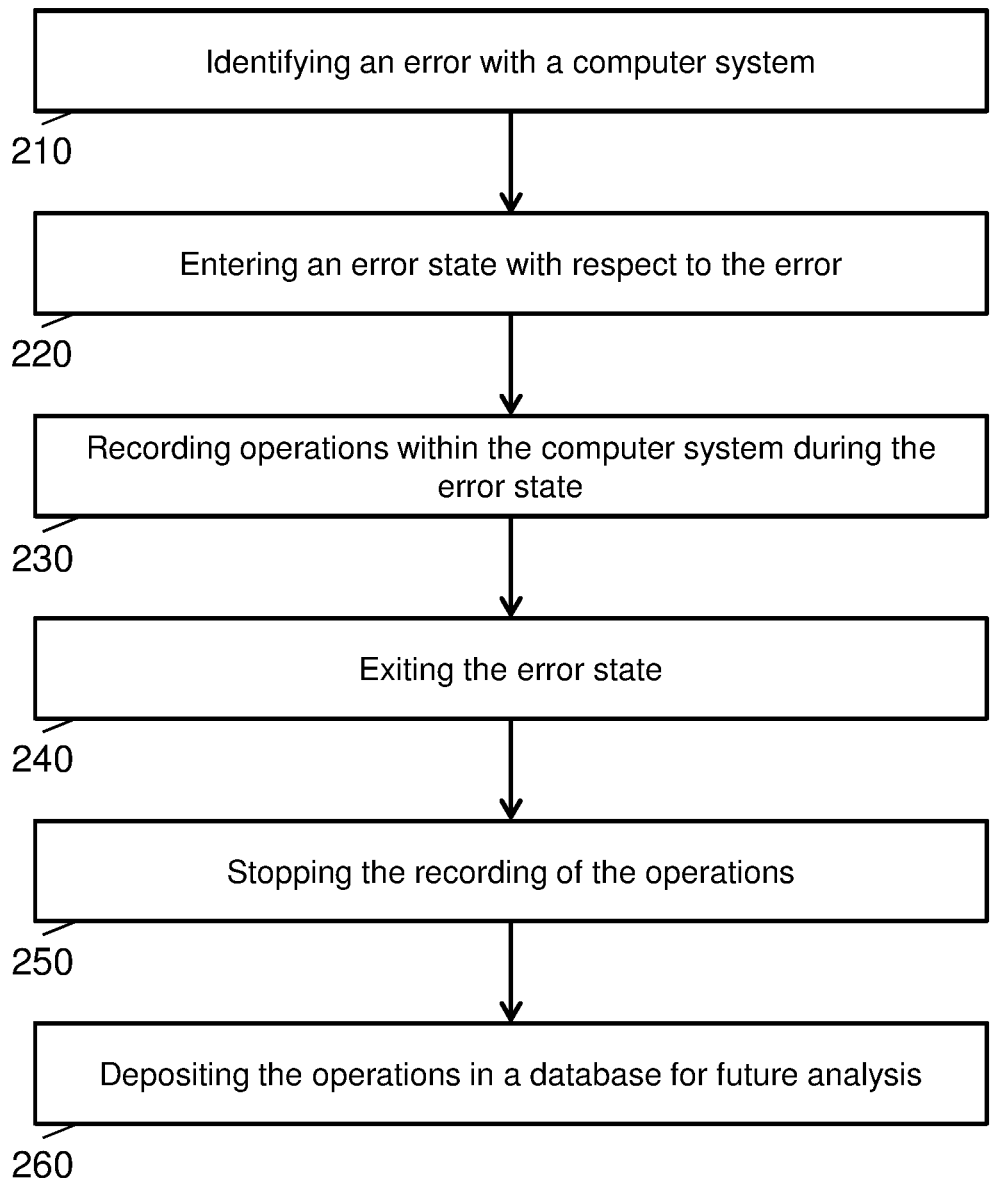
FIG. 2 depicts a process flow of a system in accordance with one or more embodiments.

FIG. 2 depicts a process flow 200 of the computer system 100 in accordance with one or more embodiments. The process flow 200 is an example of an instance where the computer system 100 aggregates operations, actions, and solutions executed the computer system 100 and/or a user with respect to an error scenario.

The process flow 200 begins at block 210, where the computer system 100 identifies an error. The error relates to one or more error scenarios, such as a hardware problem, a connectivity problem, and/or a software problem. Identifying the error can include recognizing the error as the same or similar error to a previously occurred error or determining the error as a new error (e.g., an error has not been encountered). In accordance with one or more embodiments, the computer system 100 can take action via a service availability level information processing (SLIP), where messages are logged by the computer system 100 and logs are monitored for particular message identifications. Note that each log message on the computer system 100 has a particular identifier, which is used to trigger an identification of determination of the error.

At block 220, the computer system 100 enters an error state with respect to the error. In accordance with one or more embodiments, the computer system 100 receives a message indicating a problem (e.g., "EZD0026I ERROR 0004 ASSIGNING VMAC TO DEVICE O5ETHD0") and enters an error state as a response. Because a novice user does not know how to solve the noted problem, the computer system 100 deconstructs the message so that each token is used to determine if the novice user's actions are related to a solution.

At block 230, the computer system 100 records operations within the computer system 100 during the error state. For example, the computer system 100 records all operator commands, profile (configuration file) changes, hardware state changes (for example, restoration of light on a network interface), etc.

At block 240, the computer system 100 exits the error state. The computer system 100 can exit the error state upon a manual clearance of the error state or a timeout mechanism used to exit the error state (e.g., in the absence of the error state being cleared).

At block 250, the computer system 100 stops the recording of the operations. At block 260, the computer system 100 deposits the operations in a database for future analysis. The database (e.g., centralized repository) can be located on and managed by the system memory 103 and/or the mass storage 110. The computer system 100 sorts all operations before or upon depositing in the database.

In accordance with one or more embodiments, examples of sorting by the computer system 100 that are used to identify relevance include: whether the operator command, profile change, or hardware state change contain any of the tokens in the original error message; whether the profile change or hardware state change occurred in a related component; determining a number of times an operator action been seen in previous error scenarios involving the current error message; determining whether the user performing the action solved issues in the past in a related or identical error scenario. A reputation score can also be assigned per user and utilized to rank a user's actions with respect to a solution. The reputation score can be an alpha numeric value movable on a scale to show relative experience for each user.

Figure 3:
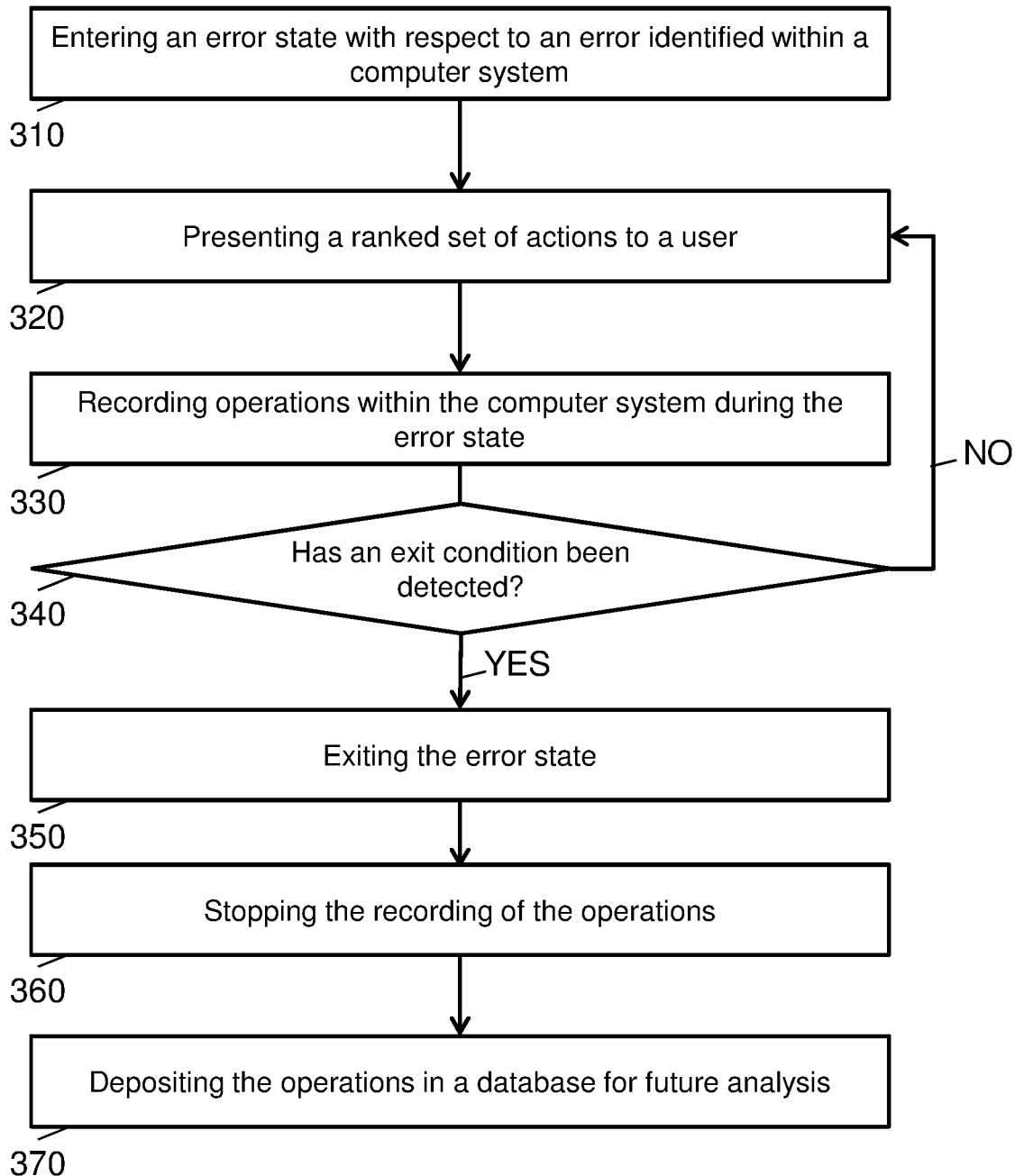
FIG. 3 depicts a process flow of a system in accordance with one or more embodiments.

FIG. 3 depicts a process flow 300 of the computer system 100 in accordance with one or more embodiments. The process flow 300 is an example of an instance where the computer system 100 ranks and presents relevant actions executed by prior users when an error scenario occurs in the computer system 100.

At block 310, the computer system 100 enters an error state with respect to an error identified within the computer system 100. The error can be associated with a component of the computer system 100. The error state is identified by the error itself. At block 320, the computer system 100 presents a ranked set of actions to a current user (e.g., a novice user). The ranked set of actions are presented to the current user during the error state. The ranked set of actions are based on previously recorded operations in the database of the system memory 103 and/or the mass storage 110.

In accordance with one or more embodiments, a user interface is provided via a display 119. The user interface presents the ranked set of actions, where each action has a previous association with the error state and error. The use interface can also present and rank publications alongside the ranked set of actions. Once an action is selected from the user interface, the computer system 100 can provide a set of prompts guiding the user to a suggested solution. The ranked set of actions can include operations performed automatically by the computer system 100 or manually by one or more users, with the goal being to present the actions that are most likely to solve the error at the top of the rankings. In accordance with one or more embodiments, the one or more users can include a first user, a second user, and a third user and each of the ranked set of actions can correspond to the one or more users.

For example, the first user can have a reputation score set to 1 out of 152, the second user can have a reputation score set to 5 out of 152, and the third user can have a reputation score set to 152 out of 152 (where a low number indicates a low reputation and a high number indicates a high reputation).

An action by the first user during a previous instance of the error state can include a profile change, which does not contain any message tokens. As this profile change has not been encountered by the computer system 100 with respect to the identified error state, this profile change action is not ranked highly within the ranked set of actions.

An action by the second user during a previous instance of the error state can include issuing an internet protocol command to the computer system 100. As the computer system 100 has encountered this internet protocol command before (e.g., 5 times with respect to the identified error state), this internet protocol command action can be ranked highly within the ranked set of actions.

Actions by the third user during a previous instance of the error state can include executing a first status command, executing the second status command, editing configuration file, executing pool command, executing a first protocol command, and executing a second protocol command. The first status command is a command that has been executed 15 times during previous error states with respect to a same component as the error. The second status command is a command that has been executed 16 times during previous error states with respect to the same component as the error. The configuration file contains one or more tokens and includes 45 different changes made during previous error states with respect to the same component as the error message. The pool command is a command that has been executed 2 times during previous error states, although with respect to a different component. The first protocol command is a command that has been executed 51 times during previous error states with respect to the same component as the error. The second protocol command is a command that has been executed 51 times during previous error states with respect to the same component as the error. While not all actions by the third user are deemed relevant, the actions completed by the third user can be ranked highly.

At block 330, the computer system 100 recording operations within the computer system during the error state. For example, the computer system 100 records all operator commands, profile (configuration file) changes, hardware state changes (for example, restoration of light on a network interface), operations to resolve the error, etc. At decision block 340, the computer system 100 determines whether an exit condition has been detected. An exit condition can include, but is not limited to, a solving of the error, a manual clearance of the error state, or a timeout mechanism used to exit the error state (e.g., in the absence of the error state being cleared).

If the computer system 100 does not detect an exit condition, then the process flow 300 returns to block 320 (as shown by the 'NO' arrow). Upon returning to block 320, the computer system 100 can present an alternative ranked set of actions that exclude any previously selected actions. If the computer system 100 detects an exit condition, then the process flow 300 proceeds to block 350 (as shown by the 'Yes' arrow).

At block 350, the computer system 100 the computer system 100 exits the error state. At block 360, the computer system 100 stops the recording of the operations. At block 370, the computer system 100 deposits the operations in a database for future analysis.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying an error with a computer system, the error associated with a component of the computer system;
   entering, by the computer system, an error state with respect to the error;
   ranking a set of actions executed by prior users during previous instances of the error state, the ranking based at least in part on a number of times that each action in the set of actions was previously executed during the previous instances of the error state with respect to the component associated with the error;
   presenting, to a user, the ranked set of actions, the presenting during the error state;
   selecting, by the user, an action from the ranked set of actions;
   providing a set of prompts to guide the user to a suggested solution, the providing during the error state and the set of prompts being associated with the selected action;
   recording, by the computer system, operations within the computer system during the error state; and
   exiting, by the computer system, the error state based on an exit condition.

2. The computer-implemented method of claim 1, wherein the ranked set of actions are stored in a database.

3. The computer-implemented method of claim 1, wherein the exit condition includes solving the error, a manual clearance of the error state, or a timeout.

4. The computer-implemented method of claim 1, wherein the computer-implemented method further comprises:
   presenting an alternative ranked set of actions that exclude any previously selected actions.

5. The computer-implemented method of claim 1, wherein the computer-implemented method further comprises:
   depositing the operations in a database after exiting the error state.

6. The computer-implemented method of claim 1, wherein a message is generated by the computer system upon detection of the error, the message includes an identifier that is utilized in identifying the error with the computer system.

7. A computer program product comprising a computer readable storage medium having program instructions embodied therewith, the program instructions executable by a processor of the computer system to cause:
   identifying an error with the computer system, the error associated with a component of the computer system;
   entering, by the computer system, an error state with respect to the error;
   ranking a set of actions executed by prior users during previous instances of the error state, the ranking based at least in part on a number of times that each action in the set of actions was previously executed during the previous instances of the error state with respect to the component associated with the error;
   presenting, to a user, the ranked set of actions, the presenting during the error state;
   selecting, by the user, an action from the ranked set of actions;
   providing a set of prompts to guide the user to a suggested solution, the providing during the error state and the set of prompts being associated with the selected action;

recording, by the computer system, operations within the computer system during the error state; and exiting, by the computer system, the error state based on an exit condition.

8. The computer program product of claim 7, wherein the ranked set of actions are stored in a database.

9. The computer program product of claim 7, wherein the exit condition includes solving the error, a manual clearance of the error state, or a timeout.

10. The computer program product of claim 7, wherein the program instructions are further executable by the processor to cause:

presenting an alternative ranked set of actions that exclude any previously selected actions.

11. The computer program product of claim 7, wherein the program instructions are further executable by the processor to cause:

depositing the operations in a database after exiting the error state.

12. The computer program product of claim 7, wherein a message is generated by the computer system upon detection of the error, the message includes an identifier that is utilized in identifying the error with the computer system.

13. A computer system comprising a processor and a memory storing program instructions, the program instructions executable by the processor to cause:

identifying an error with the computer system, the error associated with a component of the computer system;

entering, by the computer system, an error state with respect to the error;

ranking a set of actions executed by prior users during pervious instances of the error state, the ranking based at least in part on a number of times that each action in the set of actions was previously executed during the previous instances of the error state with respect to the component associated with the error;

presenting, to a user, the ranked set of actions, the presenting during the error state;

selecting, by the user, an action from the ranked set of actions;

providing a set of prompts to guide the user to a suggested solution, the providing during the error state and the set of prompts being associated with the selected action;

recording, by the computer system, operations within the computer system during the error state; and exiting, by the computer system, the error state based on an exit condition.

14. The computer system of claim 13, wherein the ranked set of actions are stored in a database.

15. The computer system of claim 13, wherein the exit condition includes solving the error, a manual clearance of the error state, or a timeout.

16. The computer system of claim 13, wherein the program instructions are further executable by the processor to cause:

presenting an alternative ranked set of actions that exclude any previously selected actions.

17. The computer system of claim 13, wherein the program instructions are further executable by the processor to cause:

depositing the operations in a database after exiting the error state.

* * * * *